United States Patent
Erlach et al.

(10) Patent No.: US 7,726,183 B2
(45) Date of Patent: Jun. 1, 2010

(54) TEST RIG FOR INTERNAL COMBUSTION ENGINES

(75) Inventors: Hans Erlach, Kühnsdorf (AT); Peter M. Ziegler, Wiesbaden (DE); Roland Rathner, Graz (AT); Helmut Schneiderbeck, Tobelbad (AT); Harald Nonn, Weinheim (DE); Martin Schmidt, Langen (DE); Michael Paulweber, Hausmannstätten (AT)

(73) Assignee: AVL List GmbH, Graz (AT)

( * ) Notice: Subject to any disclaimer, the term of this patent is extended or adjusted under 35 U.S.C. 154(b) by 356 days.

(21) Appl. No.: 11/596,971

(22) PCT Filed: May 24, 2005

(86) PCT No.: PCT/AT2005/000177

§ 371 (c)(1),
(2), (4) Date: Mar. 2, 2007

(87) PCT Pub. No.: WO2005/116604

PCT Pub. Date: Dec. 8, 2005

(65) Prior Publication Data

US 2008/0190183 A1    Aug. 14, 2008

(30) Foreign Application Priority Data

May 24, 2004    (AT) .............................. GM372/2004

(51) Int. Cl.
*G01M 15/02* (2006.01)
(52) U.S. Cl. ................................. 73/116.05; 73/116.02
(58) Field of Classification Search .............. 73/116.01, 73/116.02, 116.04, 116.05
See application file for complete search history.

(56) References Cited

U.S. PATENT DOCUMENTS

| | | | | |
|---|---|---|---|---|
| 4,466,294 A | * | 8/1984 | Bennington et al. | 73/862.13 |
| 4,520,659 A | * | 6/1985 | Lucia et al. | 73/115.02 |
| 4,732,036 A | * | 3/1988 | Weeder | 73/116.04 |
| 5,142,903 A | * | 9/1992 | Mizushina et al. | 73/115.02 |
| 5,515,712 A | * | 5/1996 | Yunick | 73/9 |
| 5,537,865 A | * | 7/1996 | Shultz | 73/115.02 |
| 5,986,545 A | * | 11/1999 | Sanada et al. | 340/439 |
| 6,023,890 A | * | 2/2000 | Zenobi | 52/64 |
| 6,343,504 B1 | * | 2/2002 | Shultz | 73/116.01 |
| 6,918,287 B2 | * | 7/2005 | Laws | 73/116.05 |
| 7,096,746 B2 | * | 8/2006 | Kemnade | 73/862.191 |
| 7,107,829 B2 | * | 9/2006 | Tachiki | 73/115.01 |
| 2006/0288764 A1 | * | 12/2006 | Langthaler et al. | 73/116 |

FOREIGN PATENT DOCUMENTS

DE    29810622    8/1999

\* cited by examiner

*Primary Examiner*—Eric S McCall
(74) *Attorney, Agent, or Firm*—Dykema Gossett PLLC

(57) ABSTRACT

In order to make it possible to also mount an original exhaust system (10) substantially leading away from the internal combustion engine (2) below the output axle (7) parallel to the extension thereof in a test rig for internal combustion engines (2), the driving engine or load generator (4) is mounted in a suspended manner at a certain vertical distance from the pedestal (1) on a support arrangement (6) mounted thereon, with the input axle (8) being substantially aligned with the output axle (7) of the internal combustion engine (2) that is to be tested, whereby the space from below the interference contour (9) of the driving engine or load generator (4) to the pedestal remains free for the passage of the exhaust system (10).

9 Claims, 2 Drawing Sheets

TEST RIG FOR INTERNAL COMBUSTION ENGINES

BACKGROUND OF THE INVENTION

1. Field of the Invention

The invention relates to a test rig for internal combustion engines which includes a pedestal upon which is arranged the internal combustion engine that is to be tested, on the one hand, and at least one rotationally connected driving engine or load generator, on the other hand, that is arranged opposite to the former on the output side.

2. The Prior Art

Test rigs of the type referred to above allow via the presetting of certain engine speed and/or torque processes of the driving engine or load generator for the simulation of the influence and/or retroactive effect of the ambient operational conditions on the output of the combustion engine that is to be tested. This is of great advantage particularly, for example, during the development phase of a combustion engine when the vehicle that is to be powered by the engine, including all of the components of the power train, does not yet exist in reality because, via the already very highly dynamically controllable driving engine or load generators, it is nowadays possible to thereby achieve nevertheless advance simulations that are very close to the reality of the later actual conditions of use.

In the context of known test rigs of the type referred to above problems always arise with regard to the space that is available on the pedestal if the testing is to be done using the mounted original exhaust system, for example, in order to test a piston internal combustion engine with several serially arranged cylinders that is to be installed with the crankshaft in the longitudinal direction of the vehicle, whereby it normally has an exhaust system that extends underneath the crankshaft axis essentially toward the back in the longitudinal direction of the vehicle. More and more frequently, this is the desired option in order to test as closely to reality as possible. In this instance, the exhaust pipes and possibly also catalytic converters and mufflers come to lie in relation to the pedestal at the location where, normally, otherwise the driving engine or load generator is arranged on the pedestal. This is why for known apparatuses to date the driving engine or load generators for such test rigs are most of the time mounted on a support frame with an open bottom on the pedestal; this, however, requires the arrangement of a transmission, a belt drive, etc., that bridges the correspondingly emerging axial displacement between combustion engine output and/or driving engine or load generator.

Also known in the art are solutions that provide for the driving engine or load generator to be connected via a bevel gear system causing the driving engine or load generator to be arranged as perpendicular next to the internal combustion engine. Furthermore, also known in the art is the use of a correspondingly long connecting shaft (often the original cardan shaft) between internal combustion engine and driving engine or load generator. In all cases, additional inertias, elasticities, tooth play etc. result in negative effects, in particular during highly dynamic operation, as well as in additional service and installation complexities and, specifically for transmission solutions, elevated noise levels at the test rig.

The object of the present invention consists therefore in providing test rigs of the type outlined in the introduction, in particular, in such a way that they can easily be used also for testing internal combustion engines with mounted original exhaust systems that substantially lead away from the internal combustion engine beneath the input axle parallel to the extension thereof without the disadvantages that afflict the known solutions.

SUMMARY OF THE INVENTION

According to the present invention this object is achieved with a test rig of the kind described in the introduction, in particular, in such a way that the driving engine or load generator is mounted on a support frame that is arranged on the pedestal in a suspended manner and at a vertical distance relative to the pedestal with an input axle that is essentially axially aligned relative to the output axle of the internal combustion engine that is to be tested. Correspondingly, the driving engine or load generator that is suspended by its mounting pod or other fastening elements on the support arrangement is easily adjustable to the axle height of the drive shaft of the combustion engine—the space that remains beneath the outside contour (interference contour) of the driving engine or load generator to the pedestal is left completely free for the passage of the exhaust system. It is therefore possible to achieve a torsionally stiff and play-free coupling of the driving engine or load generator without the use of intermediate gears, shaft extensions etc., which in turn allows for very highly dynamic testing without disruption or interference caused by the test rig. The omission of the intermediate gear also makes it possible to achieve a cheaper setup of the test rig and helps to reduce the noise level in the area of the test rig.

A particularly preferred configuration of the invention provides that a, in terms of output small-scale build, permanent-magnet machine is mounted as driving engine or load generator resulting in further advantages with regard to the available space beneath the driving engine or load generator.

A further preferred configuration of the invention provides that two or several driving engines or load generators are mounted as suspended and rotationally connected in series one after the other or parallel next to each other (via a crank mechanism with an input and/or output axle that is axially aligned relative to the output axle of the internal combustion engine). This solution is especially advantageous for larger test rig performances since two or several machines jointly produce the required performance, while they only have the interference contour (extending from the axle toward below into the space that is to be maintained free for the exhaust system) of one machine of the same type. Moreover, with crank mechanisms or primary transmissions, for example, it is often easier to implement the required performance and engine speeds.

The support arrangement can in a further preferred configuration of the invention overgrip a pedestal plate of the pedestal by way of a bridge and can be supported and fastened on both sides on the latter, whereby a very stable and, in terms of the vibrations that are generated during the testing operation, a very advantageous construction results.

For some applications another configuration of the invention is advantageous in which the support arrangement is only supported and fastened on one side on the pedestal plate of the pedestal, because this opens up an improved lateral access to the driving engine or load generator, to the exhaust system etc. as well as to other aggregates that are envisioned in this area.

In accordance with another preferred configuration of the invention, however, the pedestal itself may, in a quasi three-dimensional configuration (for example as stable test rig container), overgrip the driving engine or load generator at least partially at height; and in this case the support arrangement that is mounted from the top or from the side to this three-dimensional pedestal carries the driving engine or load generator as suspended, for example, using a hanging V-shaped arrangement.

In a further preferred configuration of the invention the driving engine or load generator can be suspended on the support arrangement with the interconnection of vibration buffers, which allows for improved vibration-engineering-specific decoupling that can, furthermore, also be influenced by way of corresponding other steps during frame construction.

Subsequently, the invention will be illustrated in more detail by way of the embodiments that are schematically depicted in the drawings.

DETAILED DESCRIPTION OF THE PREFERRED EMBODIMENTS

Figure 1:
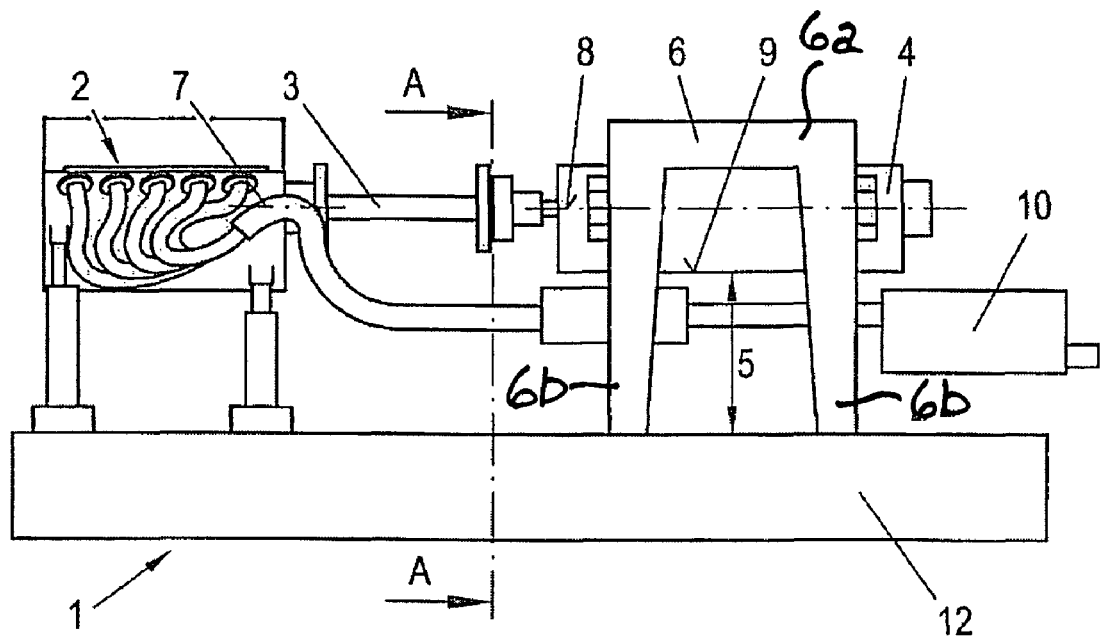
FIG. 1 shows a schematic side view of a test rig according to the invention.

The test rig that is shown in all cases includes as pedestal 1 a pedestal plate 12 arranged upon which are the internal combustion engine 2 (only seen in FIG. 1), on the one hand, and opposite to the former on the output side, rotationally connected via a connecting shaft 3 (also only seen in FIG. 1), at least one driving engine or load generator 4 (drive means). Driving engine or load generator 4 that is configured, for example, as a permanent-magnet machine, is mounted on a support arrangement 6 to be suspended at a vertical distance 5 relative to pedestal plate 12, with an axle 8 essentially being axially aligned relative to output axle 7 of internal combustion engine 2 that is to be tested, whereby there remains sufficient space beneath interference contour 9 of driving engine or load generator 4 for original exhaust system 10 that is mounted to internal combustion engine 2 to pass thereunder.

Figure 2:
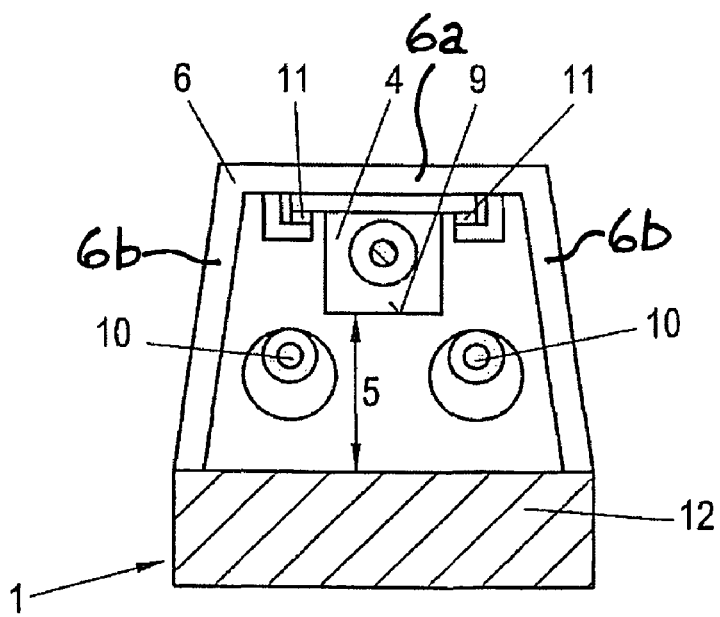
FIGS. 2 and 3 depict respectively sections along the line A-A in FIG. 1 with different configurations of the support arrangement for the driving engine or load generator.
Figure 3:
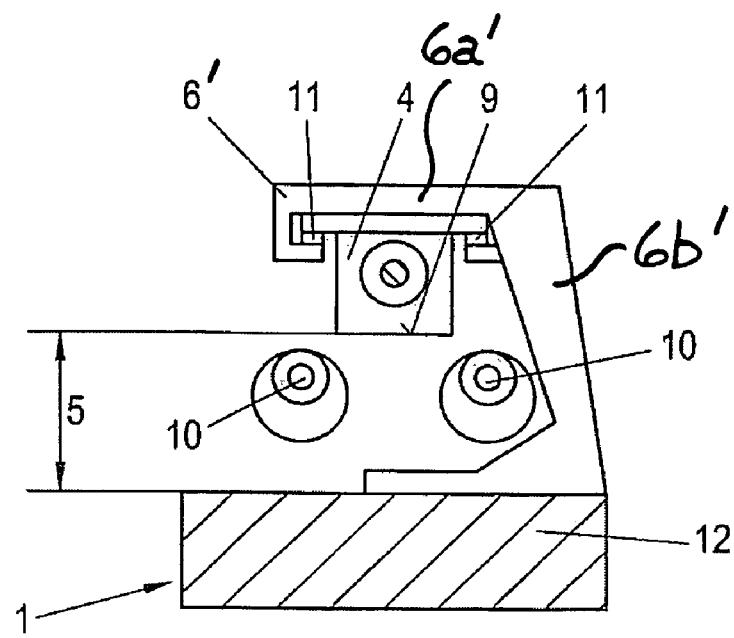
Figure 4:
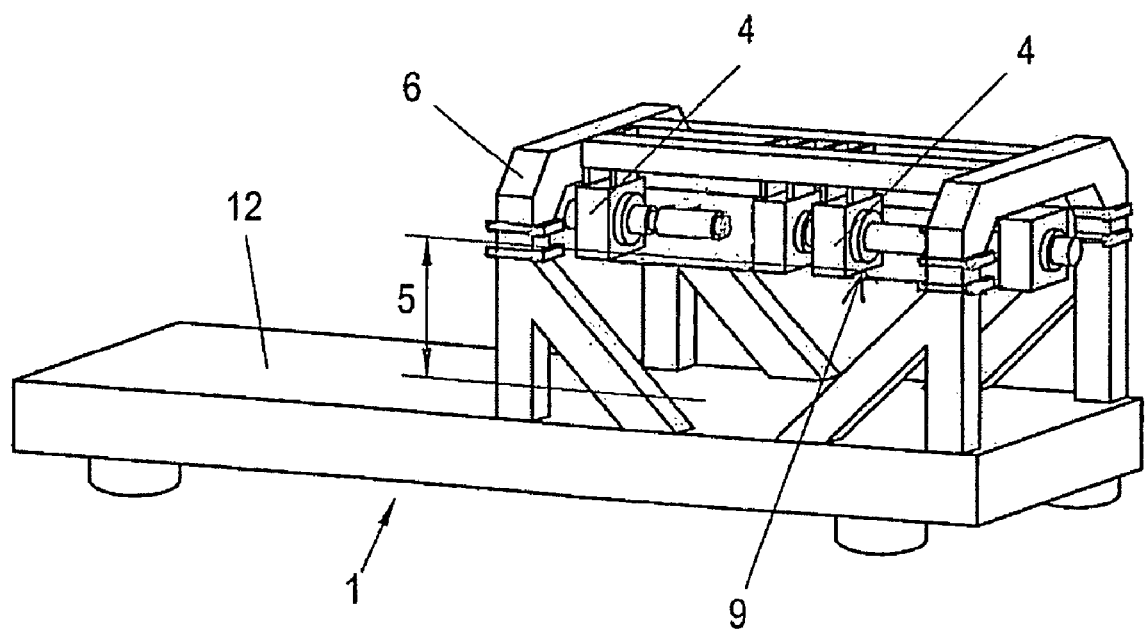
FIG. 4 shows a perspective view of a further embodiment of a test rig according to the invention.

While the configurations in accordance with FIGS. 1 to 3 envision only one driving engine or load generator 4, in the configuration in accordance with FIG. 4 that is usually envisioned for larger test rig performance, two machines 4 of this kind are mounted, rotationally connected and suspended in series one after the other, which allows, despite double the test rig performance, for maintaining the same interference contour 9 as with the individual driving engine or load generator 4. Aside from the above, it would also be possible to have an arrangement with two driving engines or load generators 4 of small-scale build that are arranged as suspended next to each other and rotationally connected via a crank mechanism; and herein the exit axle of the former is axially aligned with the output axle of the internal combustion engine that is to be tested.

In the configuration according to FIG. 2 support arrangement 6 overgrips pedestal plate 12 by way of a bridge portion 6a on legs 6b, and is supported and fastened on both sides of the pedestal plate resulting in the possibility of a very stable closed construction, as implemented in FIG. 4. In contrast, in the configuration according to FIG. 3 the support arrangement 6' includes a cantilever portion 6a' which is only supported and fastened on one side of pedestal plate 12 by leg 6b', thereby improving accessibility from the—as seen in the depiction—left side and offering nevertheless sufficient rigidity, if the one-sided support is configured correspondingly. Aside from these two variants with a pedestal plate 12 that is separately set up, as least most of the time vibration-isolated, in the area of the test rig, pedestal 1 could also circumgrip in a quasi three-dimensional configuration the internal combustion engine that is to be tested and the driving engine or load generator in a container-like or cage-like manner, not shown here; in this case, the support arrangement is fastened to this pedestal from the side or from the top, and the internal combustion engine that is to be tested could also be fastened directly by way of a usual test rig pallet.

Specially in FIGS. 2 and 3 it can be seen that, with the interconnection of vibration buffers 11, driving engine or load generator 4 is suspended on support arrangement 6 and thereby decoupled in terms of vibration.

The invention claimed is:

1. A test rig for an internal combustion engine, which comprises
    a pedestal which comprises an elongated plate,
    an internal combustion engine to be tested positioned above the pedestal, said internal combustion engine including a drive shaft and an exhaust system,
    a support apparatus mounted on the pedestal, said support apparatus comprising legs mounted at opposite sides of said plate and a bridge portion which extends between said legs, and
    a drive means suspended from the bridge portion of said support apparatus so as to be spaced above the pedestal, said drive means including a shaft which is generally aligned with the drive shaft of the internal combustion engine and is connected thereto so that rotation of the shaft of said drive means will rotate said drive shaft, said exhaust system of said internal combustion engine extending between said drive means and said pedestal.

2. The test rig as claimed in claim 1, wherein said drive means comprises a driving engine or a load generator.

3. The test rig as claimed in claim 1, wherein said drive means comprises a permanent magnet motor.

4. The test rig as claim in claim 1, wherein said drive means comprises at least two permanent magnet motors having interconnected shafts that are co-linear or parallel.

5. The test rig as claimed in claim 1, including vibration buffers positioned between said drive means and said bridge portion.

6. A test rig for an internal combustion engine, which comprises
    a pedestal which comprises an elongated plate,
    an internal combustion engine to be tested positioned above the pedestal, said internal combustion engine including a drive shaft,
    a support apparatus mounted on the pedestal, and
    a drive means suspended from the support apparatus so as to be spaced above the pedestal, said drive means including a shaft which is generally aligned with the drive shaft of the internal combustion engine and is connected thereto so that rotation of the shaft of said drive means will rotate said drive shaft, and wherein said support apparatus comprises a generally vertical leg and a cantilever portion which extends from said leg over said plate.

7. The test rig as claimed in claim 6, wherein said drive means is suspended from said cantilever portion.

8. The test rig as claimed in claim 6, wherein said internal combustion engine includes an exhaust system which extends between said drive means and said pedestal.

9. The test rig as claimed in claim 6, including vibration buffers positioned between said drive means and said cantilever portion.

* * * * *